United States Patent
Reindl et al.

[11] Patent Number: 6,121,892
[45] Date of Patent: Sep. 19, 2000

[54] SAW IDENTIFICATION OR SENSOR CONFIGURATION OPERATING WITH SURFACE ACOUSTIC WAVES

[75] Inventors: Leonhard Reindl, Stephanskirchen; Thomas Ostertag, Finsing; Werner Ruile, München, all of Germany

[73] Assignee: Siemens Aktiengesellschaft, Munich, Germany

[21] Appl. No.: 08/920,472

[22] Filed: Aug. 29, 1997

[30] Foreign Application Priority Data

Aug. 29, 1996 [DE] Germany .................. 196 34 978

[51] Int. Cl.[7] .................................................. G08B 13/14
[52] U.S. Cl. ..................... 340/825.34; 340/571; 342/42
[58] Field of Search .................. 340/825.34, 825.54, 340/825.31, 572, 571; 342/50, 51, 42, 44

[56] References Cited

U.S. PATENT DOCUMENTS

| | | |
|---|---|---|
| 4,746,830 | 5/1988 | Holland . |
| 5,554,974 | 9/1996 | Brady et al. .............................. 340/572 |
| 5,691,698 | 11/1997 | Scholl et al. ............................. 340/572 |

FOREIGN PATENT DOCUMENTS

| | | |
|---|---|---|
| 0 619 906 B1 | 10/1994 | European Pat. Off. . |
| 3937871A1 | 5/1991 | Germany . |
| 4336898C1 | 6/1995 | Germany . |
| 44 05 647 A1 | 8/1995 | Germany . |

*Primary Examiner*—Michael Horabik
*Assistant Examiner*—Anthony A. Asongwed
*Attorney, Agent, or Firm*—Herbert L. Lerner; Laurence A. Greenberg; Werner H. Stemer

[57] ABSTRACT

An SAW identification or sensor configuration or ID tag operating with surface acoustic waves for information systems, includes acousto-electrically active components disposed in different acoustic tracks on a piezoelectric substrate. A diverter acoustically couples the components.

14 Claims, 4 Drawing Sheets

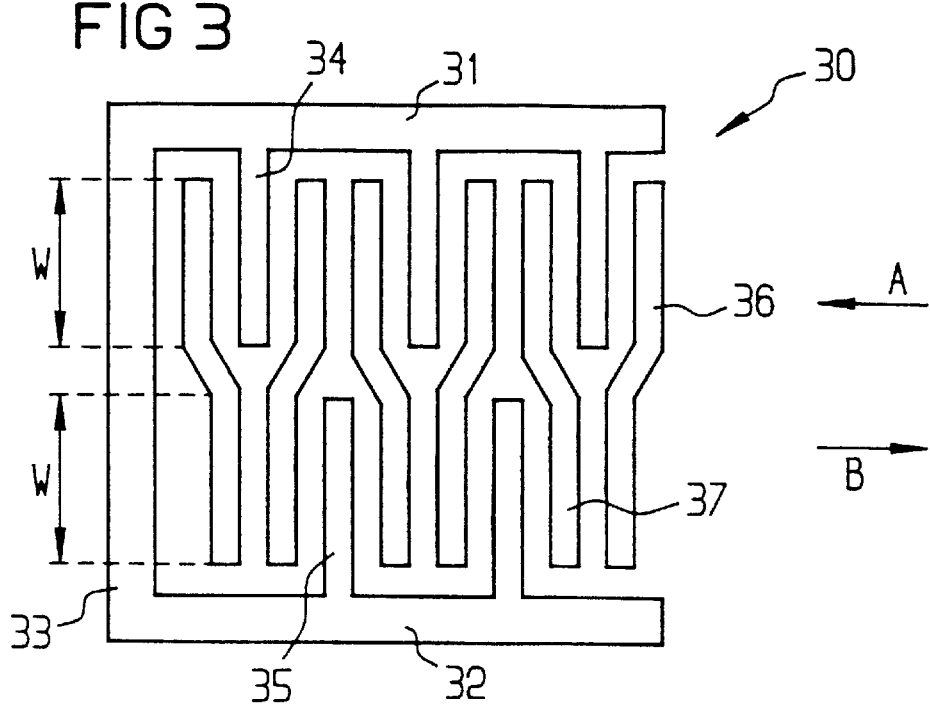
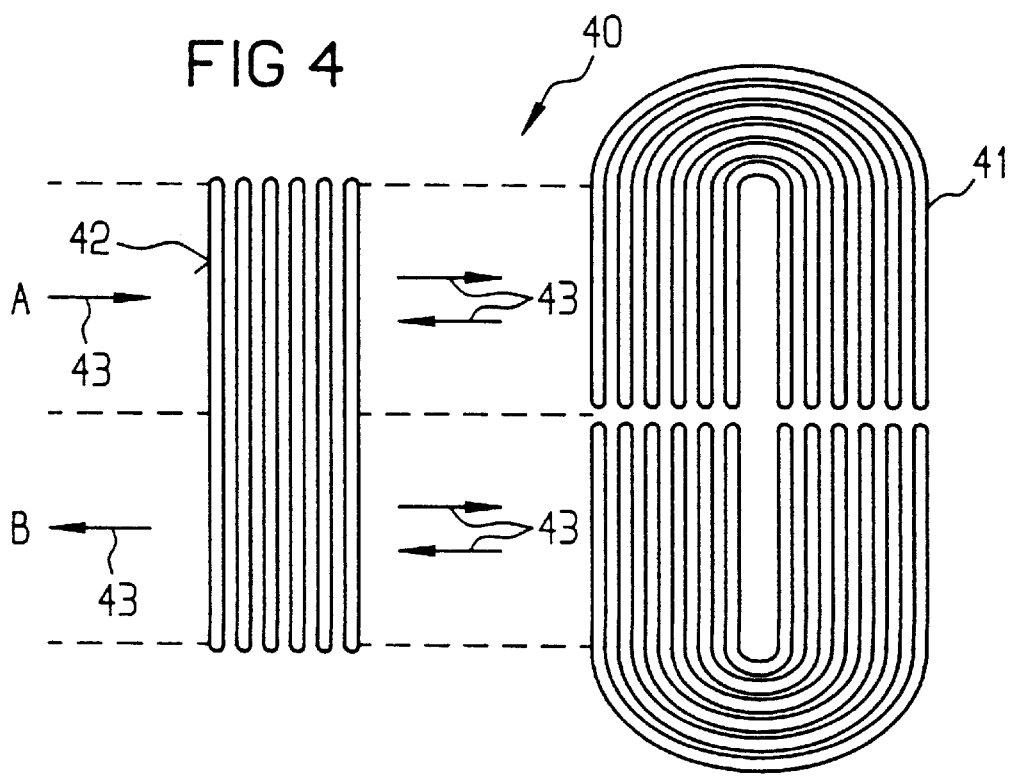

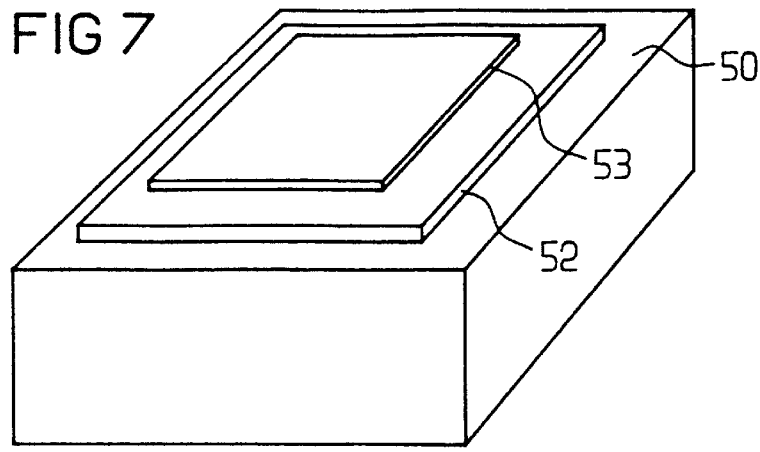
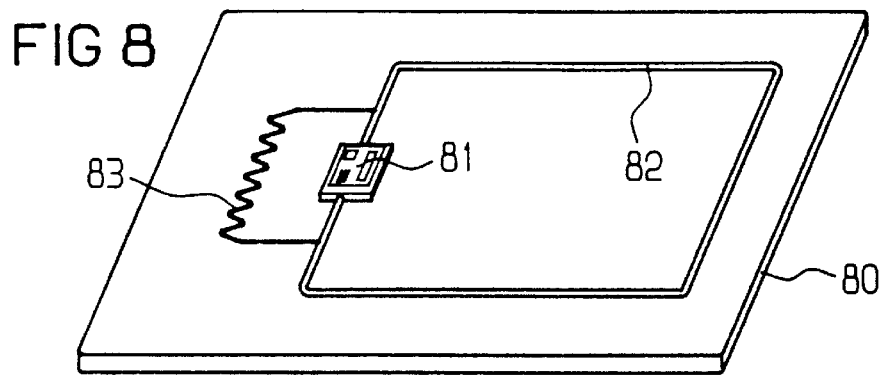
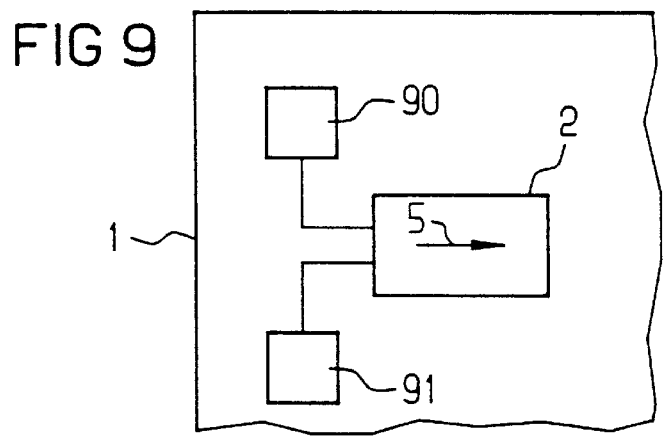

SAW IDENTIFICATION OR SENSOR CONFIGURATION OPERATING WITH SURFACE ACOUSTIC WAVES

BACKGROUND OF THE INVENTION

Field of the Invention

The present invention relates to an SAW identification or sensor configuration operating with surface acoustic waves, for identification or sensor systems, in which an interrogation/evaluation device interrogates identification or sensor configurations with a wirelessly transmitted interrogation signal and evaluates a response signal sent back from the configuration, including acousto-electrically active components on a piezoelectric substrate.

Identification marks, which are referred to as ID tags for short in the following text, are identification configurations of the generic type and are used in identification systems for the non-contact automatic identification of objects. They are disclosed, for example, in German Published, Non-Prosecuted Patent Application DE 44 05 647 A1, corresponding to U.S. patent application Ser. No. 08/701,492, filed Aug. 22, 1996. Such ID tags are components in which an electrical signal is converted through the use of a transducer into a surface acoustic wave that is reflected on a sequence of reflectors. The reflected surface acoustic wave is converted back to an electrical signal by a transducer which may be identical to the transducer that converts the electrical input signal. Depending on the configuration of the reflectors, a predetermined code is produced which represents the ID tag. The electrical signal which represents the code is sent back to a system which emits the interrogation signal, as a result of which it is possible to identify the point at which the ID tag is disposed. Such identification systems can be used in a wide range of applications.

As is stated above, the information content of the response signal coming from the ID tag is determined by the configuration of the reflectors contained in it. The information may be defined, for example, in binary form by providing a reflector configuration for a predetermined number of information bits, in which configuration a 1-bit corresponds to an existing reflector and a 0-bit corresponds to a missing reflector, that is to say reflection back to the output transducer takes place on an existing reflector, while no bit produced by reflection is present in the case of a missing reflector. Such a coding corresponds to amplitude modulation.

The information content can also correspond to phase modulation if, in a sequence of reflectors, the individual reflectors are shifted from a predetermined position, which corresponds to a 0-phase angle or relation.

For example, SAW sensors which are disclosed in European Patent 0 619 906 and can be interrogated wirelessly are sensor configurations of the generic type. They contain first SAW structures as sensor elements and second SAW structures as reference elements. It is possible to interrogate measurements which are formed by comparing the output signals from the sensor and reference elements in response to interrogation signals.

However, configurations of the type explained above must be physically constructed in such a way that pulses in the response or measurement signal can be reliably separated in order to ensure that it is possible to resolve the information in the response signal reliably. Since the resolvable time pulse interval or bit interval is inversely proportional to the bandwidth, if the available bandwidth of the interrogation signal is small, that results in a long time bit interval, from which it follows, in turn, that the distance between the SAW structures in identification or sensor configurations must be correspondingly large. Particularly if the SAW structures are disposed in a single acoustic track, that requires a correspondingly long piezoelectric substrate for the configuration. That in turn will result in a high level of physical complexity, especially for SAW configuration housings.

SUMMARY OF THE INVENTION

It is accordingly an object of the invention to provide an SAW identification or sensor configuration operating with surface acoustic waves, which overcomes the hereinafore-mentioned disadvantages of the heretofore-known devices of this general type and which is a less complex and thus more cost-effective configuration.

With the foregoing and other objects in view there is provided, in accordance with the invention, an SAW identification or sensor configuration operating with surface acoustic waves for identification or sensor systems, in which an interrogation/evaluation device interrogates identification or sensor configurations with a wirelessly transmitted interrogation signal and evaluates a response signal sent back from the configurations, comprising a piezoelectric substrate; acousto-electrically active components disposed in different acoustic tracks on the substrate; and a diverter for acoustically coupling the components.

In accordance with another feature of the invention, the acousto-electrically active components include at least one interdigital transducer and a predetermined number of reflectors, the reflectors having a number and position producing a coding in an identification system, the interdigital transducer and at least some of the reflectors disposed in the different acoustic tracks, and the diverter acoustically coupling the tracks, to form an SAW ID tag identification mark.

In accordance with a further feature of the invention, the interdigital transducer is a unidirectional transducer.

In accordance with an added feature of the invention, the diverter is a reflector multistrip coupler.

In accordance with an additional feature of the invention, the diverter includes a multistrip coupler and a multistrip reflector.

In accordance with yet another feature of the invention, the reflectors are disposed in a single acoustic track.

In accordance with yet a further feature of the invention, the reflectors code the response signal and are shifted geometrically from a predetermined 0-phase angle or relation to produce a phase modulation coding of the response signal.

In accordance with yet an added feature of the invention, there is provided a coupling structure disposed on the substrate for injecting the interrogation signal.

In accordance with yet an additional feature of the invention, the structure is a coupling loop in the shape of a frame for inductive injection of the interrogation signal.

In accordance with again another feature of the invention, the structure includes coupling pads for capacitive or direct injection of the interrogation signal.

In accordance with again a further feature of the invention, there is provided a housing disposed on the piezoelectric substrate and containing at least the acousto-electric components.

In accordance with again an added feature of the invention, the housing includes a frame sheet surrounding the electro-acoustic components and a covering sheet on the frame sheet.

With the objects of the invention in view, there is also provided a chip card and identification mark assembly, comprising a chip card having a card antenna; and an identification mark integrated into the card and having a coupling structure coupled to the card antenna.

Other features which are considered as characteristic for the invention are set forth in the appended claims.

Although the invention is illustrated and described herein as embodied in an SAW identification or sensor configuration operating with surface acoustic waves, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a plan view of a first embodiment of a diverter which can be used in the ID tag according to FIG. 1;

FIG. 4 is a plan view of a second embodiment of a diverter which can be used in the ID tag according to FIG. 1;

FIG. 7 is a perspective view of an ID tag according to FIG. 1 provided with a housing according to FIGS. 5 and 6;

FIG. 8 is a perspective view of an ID tag integrated in a chip card; and

FIG. 9 is a fragmentary, plan view of the ID tag according to FIG. 1.

DESCRIPTION OF THE PREFERRED EMBODIMENTS

Initially, before discussing the drawings in detail, it should be mentioned that the following description relates to embodiments of ID tags. However, it also applies in a manner which is evident to a person skilled in the art to sensor configurations, for example according to European Patent 0 619 906, which is mentioned above.

Figure 1:
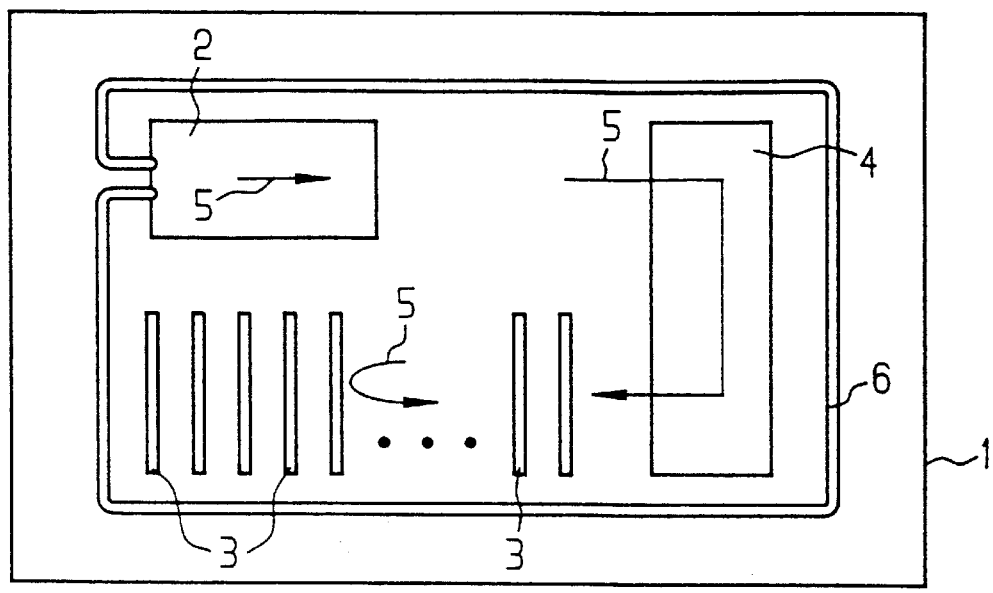
FIG. 1 is a diagrammatic, plan view of a configuration according to the invention in the form of an SAW ID tag.

Referring now to the figures of the drawings in detail and first, particularly, to FIG. 1 thereof, there is seen a diagrammatic illustration of an interdigital transducer 2, which in this case acts as an input/output transducer, as well as reflectors 3, that are provided in an ID tag in a manner which is known per se on a piezoelectric substrate 1. As was mentioned initially, the interdigital transducer 2 converts an electrical interrogation signal into an acoustic wave which is reflected on the reflectors 3 and is converted back to an electrical response signal in the interdigital transducer 2.

However, according to the invention, the interdigital transducer 2 and the reflectors 3 are not disposed one behind the other in one or more parallel acoustic tracks, but instead in different tracks which are connected acoustically in series.

Additionally, in order to pass the acoustic wave coming from the interdigital transducer 2 to the reflectors 3, a diverter 4 is provided which in turn feeds wave elements reflected from the reflectors 3 back to the interdigital transducer 2. A diverter is alternatively referred to in the art as a track changing structure. The profile of the acoustic wave elements is indicated by arrows 5 in FIG. 1.

The advantage of the above-explained structure of an ID tag according to the invention is that by placing the interdigital transducer 2 and reflectors 3 in a plurality of acoustic tracks that are connected in series, the acoustic path can be folded a number of times. Increasing the size of the substrate in the direction at right angles to the propagation direction of the acoustic wave elements is far more than compensated for by reducing the length in the direction of propagation of the acoustic wave elements, since the acoustic track is normally considerably faster than the substrate width. In addition, this makes it possible to achieve a substrate shape which has a considerably more favorable length-to-width ratio for a housing technique or for insertion into a chip card.

In a development of the invention according to FIG. 1, a structure 6 for injecting an electrical interrogation signal into the interdigital transducer 2 is provided on the substrate 1 and, in this embodiment, is constructed as an inductive coupling loop in the form of a frame. Instead of such an inductively coupling antenna, a capacitively coupling structure can also be provided according to FIG. 9, which illustrates a portion of FIG. 1. To this end, two flat coupling pads or metallizations 90, 91 which can be used on the substrate 1 are electrically coupled to the interdigital transducer 2.

Figure 2:
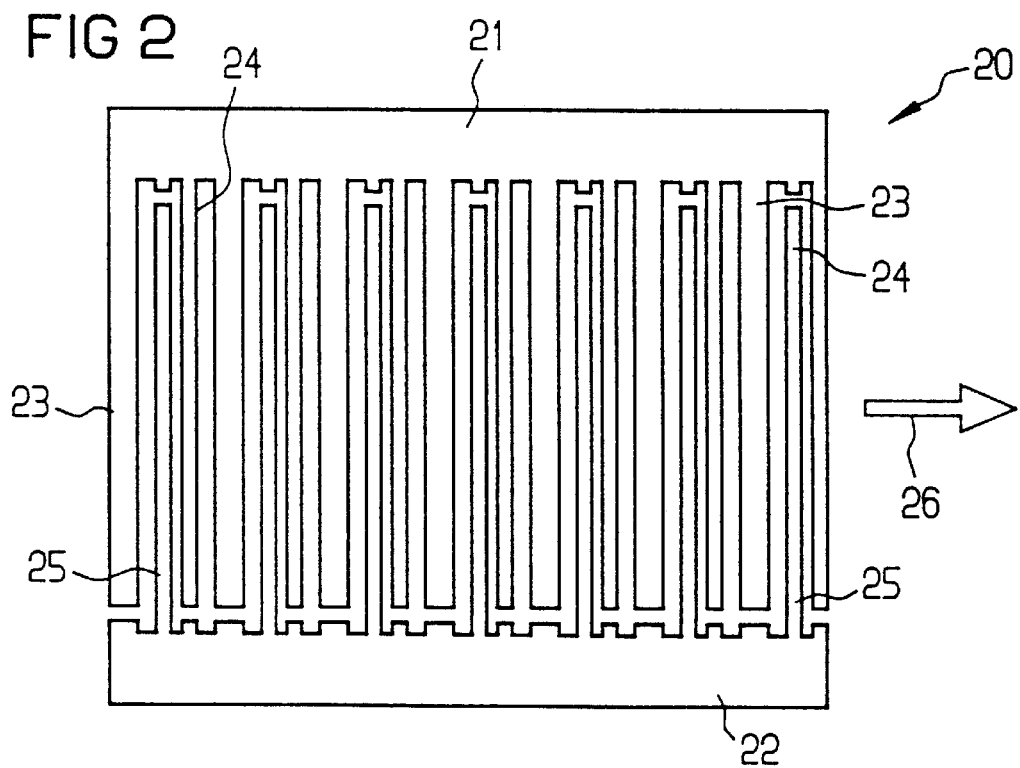
FIG. 2 is a plan view of an embodiment of an interdigital transducer in the form of a so-called SPUDT for an ID tag according to FIG. 1.

A reduced insertion loss for the ID tag and thus an increased range for an identification system can be achieved by using a Single Phase Uni-Directional Transducer (SPUDT). Such a unidirectional transducer 20 is shown in FIG. 2 and has electrode fingers 23, 24, 25 which are connected through the use of two busbars 21, 22. In each case two electrode fingers 23, 24 of different width are interleaved on the busbar 21 with an electrode finger 25 on the busbar 22. An acoustic wave emission direction is indicated by an arrow 26. Using such a unidirectional transducer makes it possible to achieve a reduction in the insertion loss of 3 dB for injection and extraction, that is to say a total of 6 dB. The maximum range of an identification system using an ID tag containing such a unidirectional transducer is increased by a factor of root 2.

FIG. 3 shows a first embodiment of the diverter 4 according to FIG. 1 in the form of a reflector multistrip coupler 30. Such a reflector multistrip coupler is formed by two busbars 31 and 32 which are connected to one another by an electrode connection 33 and to which electrode fingers 34, 35 are connected in each case. Non-connected electrode finger pairs 36, 37 in each case are disposed between these connected electrode fingers 34, 35. The width of two acoustic tracks formed by such a reflector multistrip coupler 30 is designated by reference symbol W, while two opposing propagation directions of an acoustic wave are designated by respective reference symbols A and B.

A second embodiment of a diverter is illustrated in FIG. 4 and is designated, in general by reference numeral 40. This diverter is formed by a multistrip coupler 42 and a multistrip reflector 41 which has a structure in the shape of an arena or ring. Propagation directions of acoustic waves in this case are indicated by arrows 43, while two acoustic tracks are designated by reference symbols A and B.

Figure 5:
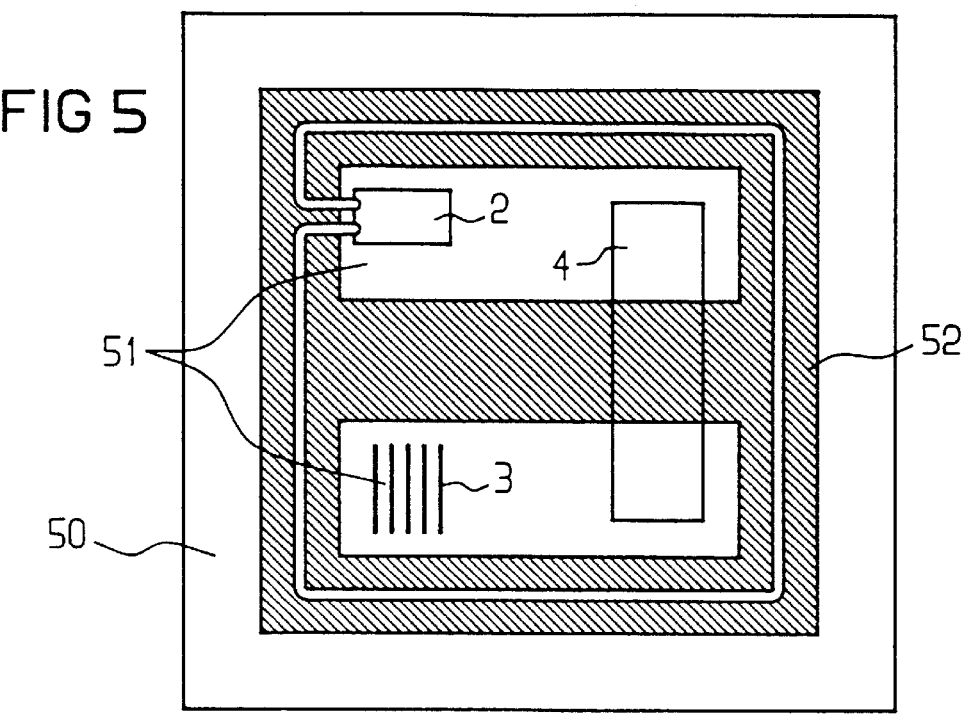
FIG. 5 is a plan view of a housing part for the acoustically active parts of an ID tag according to FIG. 1.
Figure 6:
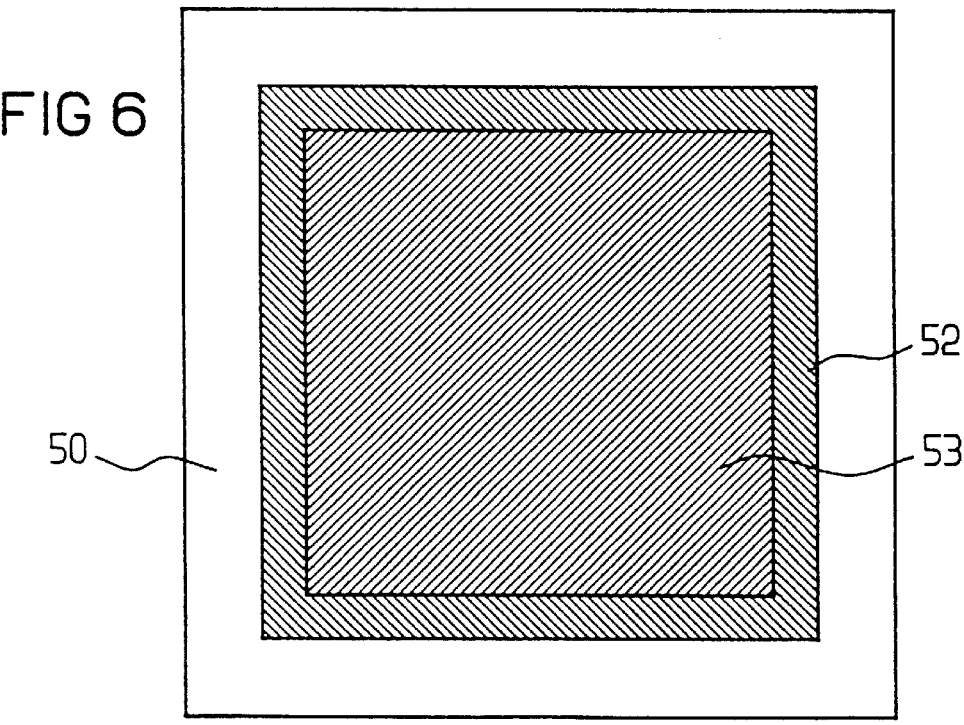
FIG. 6 is a plan view of a closed housing corresponding to FIG. 5 for the acoustically active parts of the ID tag according to FIG. 1.

FIGS. 5 to 7 show a possible embodiment of a housing for an ID tag according to the invention, which covers at least the acousto-electric components and in which it is possible to regard the piezoelectric substrate of the ID tag as a housing part.

According to FIG. 5, a piezoelectric substrate 50 has a sheet laminated thereon. The sheet can be structured photolithographically and is structured in such a manner that a frame sheet 52 remains only on acoustically nonactive regions of the substrate 50, while acousto-electric components remain free of the frame sheet 52 in regions 51. An exception may be the diverter 4 which is still covered in a central region thereof, as a result of which the structural stability is increased and, at the same time, acoustic crosstalk by diffraction between the acoustic tracks can be eliminated.

According to FIG. 6, a further sheet is then laminated onto the configuration according to FIG. 5 in such a manner that a covering sheet 53 is produced, which produces a microcavity above the acousto-electric components that protects the acoustics.

Such a configuration is illustrated diagrammatically in perspective in FIG. 7.

Housings for configurations according to the invention are not limited to the physical form explained above.

Thus, for example, a housing termination can be formed by a cover which is structured to accommodate the acousto-electrically active components of the configuration. The cover can be connected to the piezoelectric substrate by bonding, glass solder and directly by wafer bonding.

Furthermore, for example, a glass grating which surrounds the acousto-electrically active components of the configuration can also be applied to the piezoelectric substrate, on which a cover is mounted in a suitable manner.

FIG. 8 diagrammatically shows one option illustrating how an ID tag according to the invention and of the type described above can be integrated in a chip card. The ID tag, which is designated by reference numeral 81 in FIG. 8, is placed onto a chip card 80 in a suitable manner, and its coupling structure 6 according to FIG. 1, or its coupling pads 90, 91 according to FIG. 9, are coupled to a card antenna 82. If required, electrical matching can be carried out if the ID tag coupling structure is inductively coupled to the card antenna. Such matching is indicated diagrammatically in FIG. 8 by a matching element 83. In addition, it should be mentioned that the coupling need not be inductive or capacitive. A direct connection-bonded connection may also be used, for which purpose bonding pads corresponding to the pads 90, 91 are provided.

We claim:

1. A SAW identification or sensor configuration operating with surface acoustic waves for identification or sensor systems, in which an interrogation/evaluation device interrogates identification or sensor configurations with a wirelessly transmitted interrogation signal and evaluates a response signal sent back from the configurations, comprising:

a piezoelectric substrate;
acousto-electrically active components disposed in different acoustic tracks on said substrate; and
a diverter for acoustically coupling said components in series and for coupling an acoustic surface wave from one of said different acoustic tracks to another of said different acoustic tracks.

2. The configuration according to claim 1, wherein said acousto-electrically active components include at least one interdigital transducer and a predetermined number of reflectors, said reflectors having a number and position producing a coding in an identification system, said interdigital transducer and at least some of said reflectors disposed in said different acoustic tracks, and said diverter acoustically coupling said tracks, to form an SAW ID tag identification mark.

3. The configuration according to claim 2, wherein said interdigital transducer is a unidirectional transducer.

4. The configuration according to claim 1, wherein said diverter is a reflector multistrip coupler.

5. The configuration according to claim 1, wherein said diverter includes a multistrip coupler and a multistrip reflector.

6. The configuration according to claim 2, wherein said reflectors are disposed in a single acoustic track.

7. The configuration according to claim 2, wherein said reflectors code the response signal and are shifted geometrically from a predetermined 0-phase angle to produce a phase modulation coding of the response signal.

8. The configuration according to claim 1, including a coupling structure disposed on said substrate for injecting the interrogation signal.

9. The configuration according to claim 8, wherein said structure is a coupling loop in the shape of a frame for inductive injection of the interrogation signal.

10. The configuration according to claim 8, wherein said structure includes coupling pads for capacitive injection of the interrogation signal.

11. The configuration according to claim 8, wherein said structure includes coupling pads for direct injection of the interrogation signal.

12. The configuration according to claim 1, including a housing disposed on said piezoelectric substrate and containing at least said acousto-electric components.

13. The configuration according to claim 12, wherein said housing includes a frame sheet surrounding said electro-acoustic components and a covering sheet on said frame sheet.

14. A chip card and identification mark assembly, comprising:

a chip card having a card antenna; and
an identification mark integrated into said card in the form of a SAW identification or sensor configuration operating with surface acoustic waves for identification or sensor systems, in which an interrogation/evaluation device interrogates identification or sensor configurations with a wirelessly transmitted interrogation signal and evaluates a response signal sent back from the configurations, said identification mark including:
a piezoelectric substrate;
acousto-electrically active components disposed in different acoustic tracks on said substrate, said acousto-electrically active components including at least one interdigital transducer and a predetermined number of reflectors, said reflectors having a number and position producing a coding in an identification system, said interdigital transducer and at least some of said reflectors disposed in said different acoustic tracks;
a diverter for acoustically coupling said components and said tracks in series and for coupling an acoustic surface wave from one of said different acoustic tracks to another of said different acoustic tracks; and
a coupling structure disposed on said substrate for injecting the interrogation signal, said coupling structure coupled to said card antenna.

\* \* \* \* \*